(12) United States Patent
Gibbens

(10) Patent No.: US 11,229,199 B2
(45) Date of Patent: Jan. 25, 2022

(54) REPOSITIONABLE TREE STAND

(71) Applicant: Jerald L. Gibbens, Okmulgee, OK (US)

(72) Inventor: Jerald L. Gibbens, Okmulgee, OK (US)

( * ) Notice: Subject to any disclaimer, the term of this patent is extended or adjusted under 35 U.S.C. 154(b) by 0 days.

(21) Appl. No.: 13/853,950

(22) Filed: Mar. 29, 2013

(65) Prior Publication Data

US 2014/0124295 A1 May 8, 2014

Related U.S. Application Data

(60) Provisional application No. 61/617,455, filed on Mar. 29, 2012.

(51) Int. Cl.
*A01M 31/02* (2006.01)

(52) U.S. Cl.
CPC .................... *A01M 31/02* (2013.01)

(58) Field of Classification Search
CPC ....... A01M 31/02; A01M 31/025; E04G 3/24; A45F 3/26
See application file for complete search history.

(56) References Cited

U.S. PATENT DOCUMENTS

| | | | | |
|---|---|---|---|---|
| 4,069,891 A * | 1/1978 | McClung | ............. | A01M 31/02 182/187 |
| 4,582,168 A * | 4/1986 | Frey | ...................... | A01M 31/02 108/135 |
| 5,143,176 A * | 9/1992 | Burdette | ............... | A01M 31/02 182/133 |
| 5,199,527 A * | 4/1993 | Jennings | ................... | A45F 3/26 182/187 |
| 5,316,104 A * | 5/1994 | Amacker | .............. | A01M 31/02 182/133 |
| 5,328,240 A * | 7/1994 | Neumuller | ............. | A47C 9/025 297/338 |
| 5,482,137 A * | 1/1996 | McNeill | ................ | A01M 31/02 182/136 |
| 5,848,666 A * | 12/1998 | Woodall | .................... | A45F 3/26 182/187 |
| 6,102,158 A * | 8/2000 | Winschel | ....................... | 182/187 |
| 6,510,922 B1 * | 1/2003 | Hodnett | .............. | A01M 31/025 135/90 |
| 6,571,916 B1 * | 6/2003 | Swanson | ....................... | 182/187 |
| 6,942,065 B1 * | 9/2005 | Price | .................. | A01M 31/025 135/901 |

(Continued)

*Primary Examiner* — Daniel P Cahn
(74) *Attorney, Agent, or Firm* — Scott R. Zingerman; GableGotwals

(57) ABSTRACT

A stand for mounting to a (tree) structure to give an occupant an elevated support platform and including a basket e supporting a platform. The basket frame may include a seat having a seat bottom and seat back such that the seat back is capable of pivoting with respect to the seat bottom. A bracket supports the basket frame and/or platform and is repositionable with respect to the tree. The bracket includes a base component, mounting member, and hinge assembly. The hinge assembly is secured to the base component so as to be capable of repositionable rotation in a first axis with respect to the base component; and the mounting member is secured to the hinge assembly so as to be capable of repositionable rotation on a second axis with respect to the hinge assembly.

10 Claims, 10 Drawing Sheets

(56) References Cited

U.S. PATENT DOCUMENTS

| | | | | |
|---|---|---|---|---|
| 6,945,361 | B1* | 9/2005 | Hedgepeth | A01M 31/02 182/142 |
| 6,988,588 | B2* | 1/2006 | Prejean | A01M 31/02 182/136 |
| 7,036,632 | B1* | 5/2006 | Price | A01M 31/025 182/187 |
| 7,377,361 | B1* | 5/2008 | Tschida | A01M 31/02 182/187 |
| 7,926,775 | B1* | 4/2011 | Milazzo | A01M 31/02 248/230.8 |
| 7,958,968 | B1* | 6/2011 | Stabler | E04H 15/04 135/90 |
| 8,381,876 | B1* | 2/2013 | Darden | A63B 27/02 182/136 |
| 8,522,920 | B1* | 9/2013 | Salyer et al. | 182/188 |
| 8,556,036 | B1* | 10/2013 | Meredith et al. | 182/188 |
| 8,683,909 | B1* | 4/2014 | Copus | F41A 23/16 182/127 |
| 8,794,382 | B2* | 8/2014 | Hugher | A01M 31/02 182/138 |
| 9,357,762 | B2* | 6/2016 | Dorrity | A01M 31/02 |
| 9,585,379 | B2* | 3/2017 | Dorrity | A01M 31/02 |
| 9,938,734 | B1* | 4/2018 | Garis | E04G 5/067 |
| 2002/0078988 | A1* | 6/2002 | Valpredo | A01M 31/025 135/90 |
| 2003/0024559 | A1* | 2/2003 | Fields | A01M 31/025 135/90 |
| 2008/0169156 | A1* | 7/2008 | Leishman | A01M 31/02 182/187 |
| 2011/0226553 | A1* | 9/2011 | Ekes, II | 182/188 |
| 2011/0308887 | A1* | 12/2011 | Johnson | A01M 31/02 182/187 |

* cited by examiner

REPOSITIONABLE TREE STAND

CROSS REFERENCE TO RELATED APPLICATION

This application claims the benefit of U.S. Provisional Application No. 61/617,455 filed Mar. 29, 2012, herein incorporated by reference in its entirety for all purposes.

FIELD OF THE INVENTION

The present invention relates to tree stand designs. Specifically, the present invention relates to portable tree stands used for hunting and/or observing wildlife and/or game.

BACKGROUND OF THE INVENTION

The technique of observing, photographing and/or hunting wildlife and/or game animals, particularly deer, out of platforms that have been attached at elevated positions to trees and artificial structures has been well established. These platforms have evolved over time from a few pieces of wood nailed in the fork of a tree to fully enclosed self-supporting blinds. Many deer hunters today use a device that falls between these two extremes, the most popular being the portable tree stand.

These devices in their most common form are comprised of a metal platform for the hunter to stand on or a seat for him/her to sit on while waiting on their game to appear close enough to get a shot typically from a firearm, a bow and arrow, or even a camera. They also generally include some sort of metal frame to connect the base to the seat and a system or device for attachment to a tree. These devices have the advantages of providing the hunter a place to ambush his/her quarry from a vantage point that is above the animal's normal line of sight. They have the further advantage of being relatively easy and quick to move from one tree to another allowing the hunter to take advantage of changing wind conditions and changing travel patterns of their intended wildlife or game animal.

For the hunter to be successful using these tree stands, he/she needs to be in them well before the game starts moving and needs to stay in them until it is no longer reasonable to expect to see or get a shot at the animal he/she intends to capture or harvest. This necessitates the hunter spending many hours in his/her stand being exposed to the elements all the while trying to remain as still as possible to prevent detection.

A significant disadvantage of the tree stands on the market today is they are all more or less uncomfortable. If the hunter is not comfortable he/she will have a hard time staying motionless enough for a sufficient period of time in order to remain undetected. Furthermore, the uncomfortable hunter will not stay in the stand long enough to obtain his/her goal. The back of the seat on the currently known commercial tree stand designs is fixed in one place. By way of example, one of the first things one generally does when he/she gets in someone else's vehicle is to adjust the back of the seat to a position of comfort and/or readiness to drive the vehicle. Likewise, when one intends to watch TV for an extended period of time he/she reclines the back of his/her seat and settles in. A need, therefore exists for a tree stand which may be manipulated to a position of comfort or readiness as desired by the occupant.

Another aspect that makes the tree stands on the market today uncomfortable is that the hunter using them is exposed to the elements. In the northern hemisphere deer season is traditionally during the fall and winter months, which in most places means cold wet weather. Once again the cold wet hunter will not stay long enough and still enough in the stand to be successful. A need, therefore, also exists for a tree stand which may be capable of providing some sort of shelter and protection to the occupant from the weather.

The next deficiency that the tree stands on the market today have is in the way they are limited in how and where they can be mounted in the tree or other like structure. There are many things a hunter should take into consideration when deciding where to place a tree stand. One important thing a hunter should look for when considering stand location is a place they are likely to see acceptable game within range of their camera or weapon of choice during the hours they will be hunting. Another factor is minimizing the likelihood of scent detection. This is most often accomplished by picking a tree that is downwind of where the wildlife or game animals are most likely to appear. Also relevant to scent detection is the height at which the stand will be placed in the tree. The higher the stand, the less likely the hunter's scent will reach the target animal.

The next thing the hunter should consider is having good shooting lanes to the likely location of the quarry animal without being visibly detected. This is even more important when bow hunting due to how close the target has to be and the fact that the hunter may have to stand up and draw the bow, thereby creating lots of movement. This makes stand location even more critical. Ideally in hardwood trees, the stand should be placed just above the lower branches and in a position in which the tree can give the hunter cover while drawing the bow. This ideal location is usually on the opposite side of the trunk from where the quarry is expected to approach.

Another consideration is proper location of the stand. The problem here is that many times with the stands on the market today once the ideal location in the ideal tree is identified, there is not a branch or location in the tree to which the stand can be properly mounted. There are very few places in many species of hardwood trees that are truly vertical. Most of the stands marketed today are designed to be mounted to a vertical or substantially vertical trunk or branch. The ones that can be attached to an angled section of the tree can only be attached to the top side of the angle. For instance; a branch that has its top leaning at a 45 degree angle to the west could only have these stands mounted on the east side which, most likely would not be the most advantageous position from a tactical viewpoint. A need, therefore, additionally exists for a tree stand which provides adjustment in two different planes thus allowing substantially level mounting of this device to any branch of proper size in any tree while still providing a tactical advantage.

SUMMARY OF THE INVENTION

A tree stand for mounting to an elevated structure such as a tree or a pole, tower tripod or other artificial structure (hereinafter "tree" unless otherwise specified) to give a hunter, photographer, wildlife observer or the like (hereinafter "occupant") an elevated support platform and preferably includes a place to sit comfortably for long period of time. The tree stand of the present disclosure includes a basket frame supporting a platform. The basket frame may include a seat structure having a seat bottom and seat back, supported from the frame adjacent the platform. The seat bottom and seat back are configured such that the seat back is capable of pivoting with respect to the seat bottom.

The tree stand of the present disclosure is preferably repositionable for retaining an occupant above the ground. The tree stand may alternatively include a bracket capable of being supported from a tree; a platform being supported from said bracket such that the bracket is repositionable with respect to the tree so that the platform is capable of retaining the occupant on a substantially level platform. The bracket may further include a hinge assembly positioned between a base component and a mounting member. The hinge assembly may be secured to the base component so as to be capable of repositionable rotation in a first axis with respect to the base component; and the mounting member may be secured to the hinge assembly so as to be capable of repositionable rotation on a second axis with respect to the hinge assembly.

The tree stand of the present disclosure preferably includes the following features:

a. A seat with a back that reclines or is otherwise manipulable for the purpose of providing comfort for the occupant or places the occupant in a position of readiness for approaching game/wildlife.

b. It is preferably capable of being enclosed with covering such as light gauge camouflaged sheet metal, canvas or heavy canvas or the like for the purpose of providing the occupant of the stand and the stand's contents protection from the weather and concealment from game and wildlife. The covering would preferably enclose a box or basket frame.

c. The reclining back to the seat may fold forward when not in use to act as a weather and varmint proof lid for the purpose of keeping the inside of the stand and its contents dry and free from damage from animals such as squirrels and rats that may otherwise inhabit the structure or gnaw on the non-metal parts.

d. May include a preferably fire resistant weather proof camouflaged blanket that is bundled and stored in the stand when not being used and then unbundled and extended over the occupant to provide warmth and concealment.

e. This blanket when used with the covering of light gauge camouflaged sheet metal that may cover the box frame and back of the seat also preferably provides containment of the occupants scent which helps prevent detection by game animals and wildlife.

f. Due to its enclosed structure in a preferred arrangement, the present tree stand can be lighted and/or heated by the use of a lighting and/or heating device, including an enclosed flame type device.

g. The tree stand of the present disclosure may also preferably include a bracket which is adjustable to provide the ability to position the stand in at least two different directions to facilitate mounting the stand to any branch (selected of suitable size and strength) of any tree no matter the angle at which it is growing/directed. This allows the stand to be mounted in the best tactical location in order to position the occupant so that he or she is facing the direction of approach of the selected game, rather than trying to find a position on the tree that is at the correct angle.

h. In an alternate arrangement, the stand of the present disclosure could be supported from a platform such as a tripod as is known in the art. In such an embodiment, a bracket may not be necessary as the stand would not require a tree for support and may thus be a free-standing structure.

i. In another embodiment, a ladder may be secured (perhaps removably) to the tree stand to provide access to the enclosed frame.

Other features and advantages of the repositionable tree stand of the present disclosure may be evident to one skilled in the art and/or may be contained in the following disclosure and figures.

DETAILED DESCRIPTION OF THE PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processes and manufacturing techniques are omitted so as to not unnecessarily obscure the embodiments herein. The examples used herein are intended merely to facilitate an understanding of ways in which the invention herein may be practiced and to further enable those of skill in the art to practice the embodiments herein. Accordingly, the examples should not be construed as limiting the scope of the claimed invention.

The tree stand of the present disclosure is a device that is mounted to a tree, pole, tripod, telephone pole or any natural or artificial or other like elevated structure (herein referred to as "tree" unless otherwise specified) in order to facilitate the observation or hunting of wildlife such as deer by giving the occupant an elevated support platform preferably including a place to sit comfortably for long periods of time. In preferred arrangements the device includes the following structure and features, without limitation.

Figure 1A:
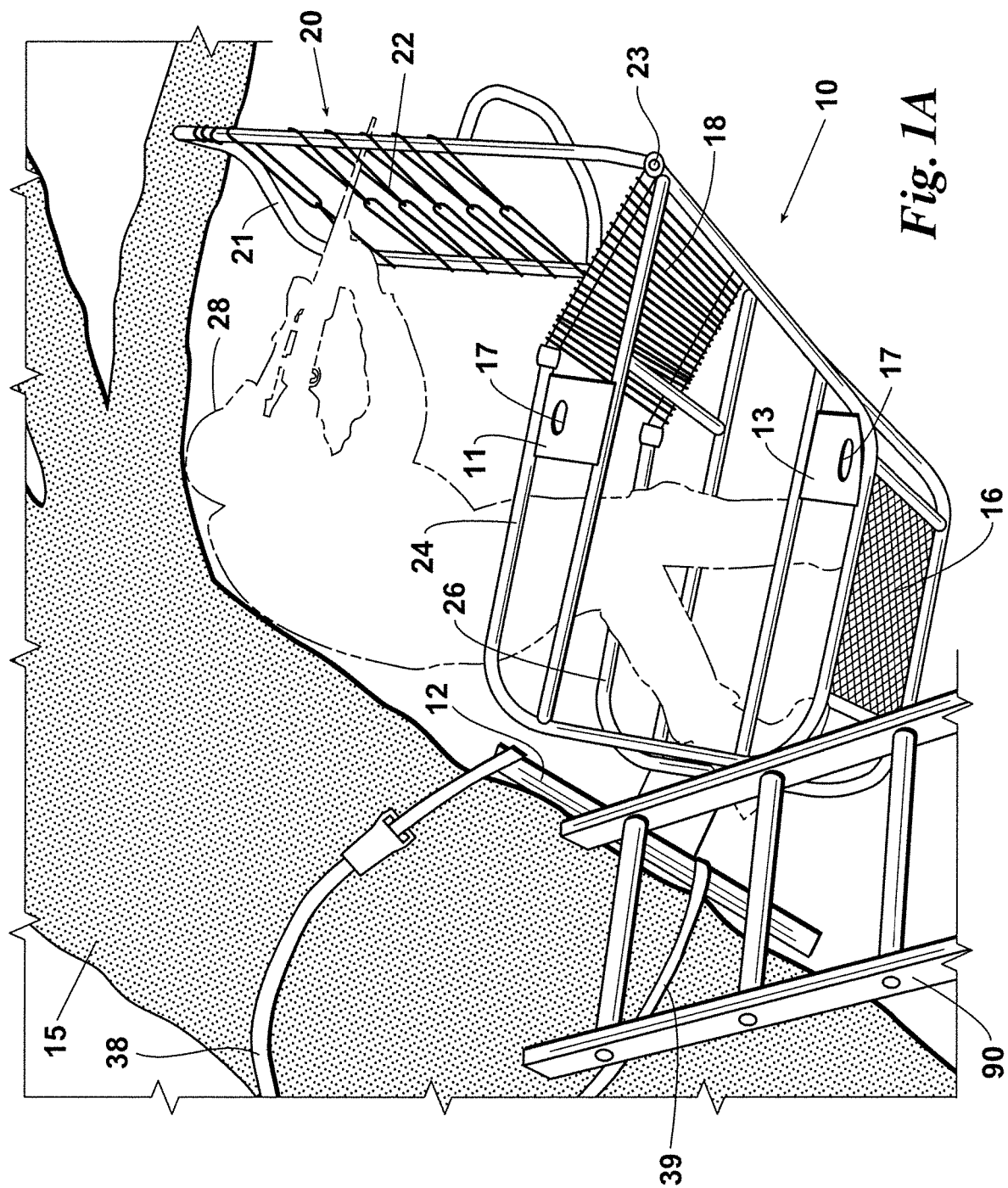
FIG. 1A is a view of the tree stand of the present disclosure mounted to a non-vertical tree branch and including and depicting a hunter position therein.
Figure 1B:
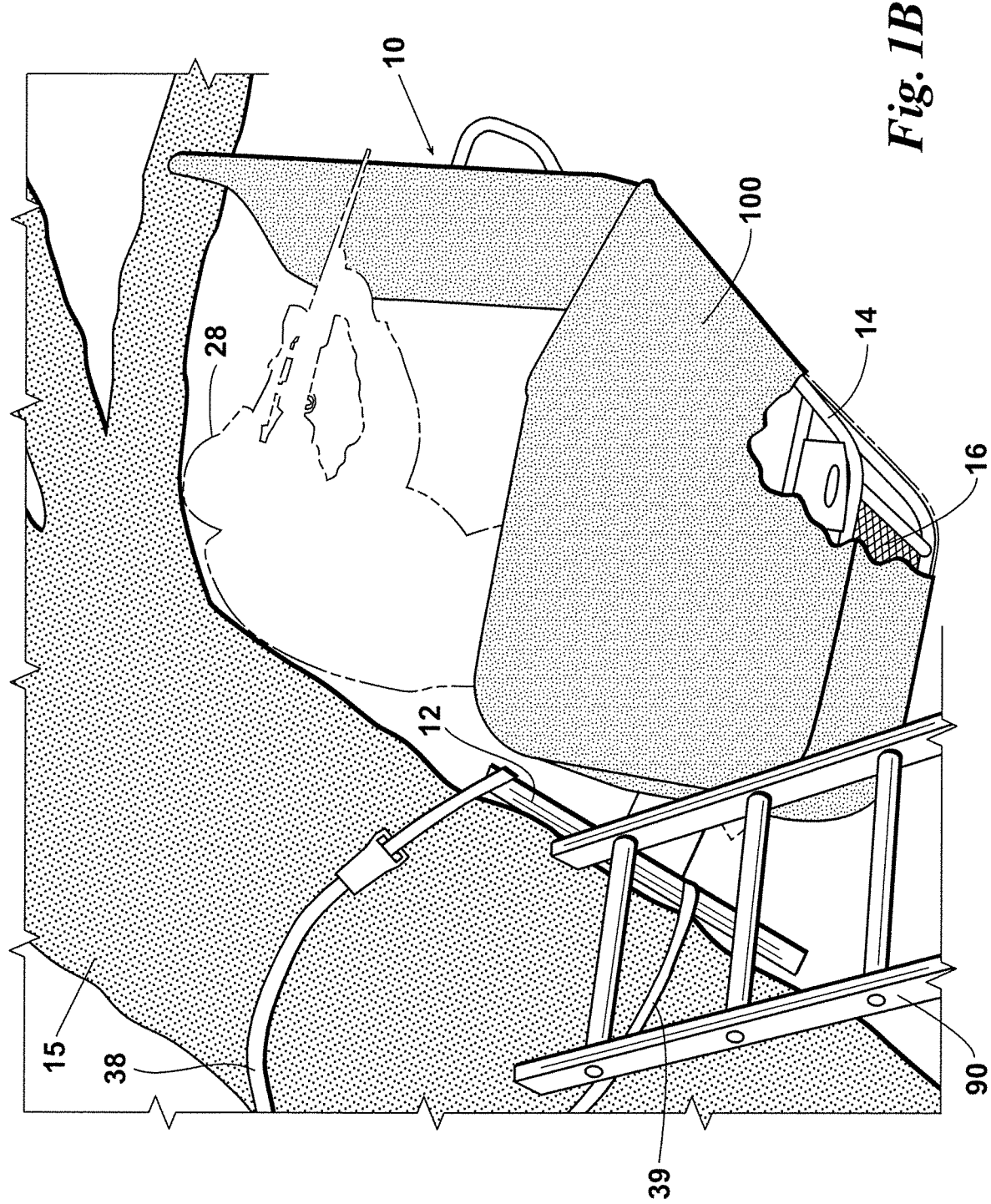
FIG. 1B is a view of the tree stand of the present disclosure depicting material covering the basket frame so as to provide an enclosed structure.

With reference to FIG. 1, the tree stand of the present disclosure includes, generally a preferably metal box or basket type frame 10 supported from a bracket 12 capable of mounting to a tree 15 or other structure, preferably at a location raised from the ground. A frame 10 includes a solid base to stand on and supports a seat structure 20. It is understood that frame 10 could alternately be constructed from other suitable materials such as carbon fiber, plastic or even wood, without limitation. The frame 10 defines a support structure that preferably includes a platform or solid base 16 and is suitably constructed so as to be capable of supporting one or more occupants. Frame 10 may include sides 24 and 26 of a predetermined height thereby forming a basket frame 14 which may or may not be suitable for or intended to assist against the occupant 28 falling out of the basket frame 14 or off the platform 16. In one preferred embodiment this would be of a height which would come to the midpoint and preferably just above the average man's knees. The box type frame 10 is preferably open on the top. In a deluxe embodiment (FIG. 1B), the front, back and sides of basket frame 14 can be covered with panel members 100 such as, without limitation, light gauge sheet metal, plastic, carbon fiber, or canvas. In a basic embodiment, frame 10 may be supported by bracket 12 and include/support only platform 16 and seat structure 20. In a further basic embodiment, basket frame 10 may be supported directly by an artificial structure without the use of bracket 12.

Figure 2:
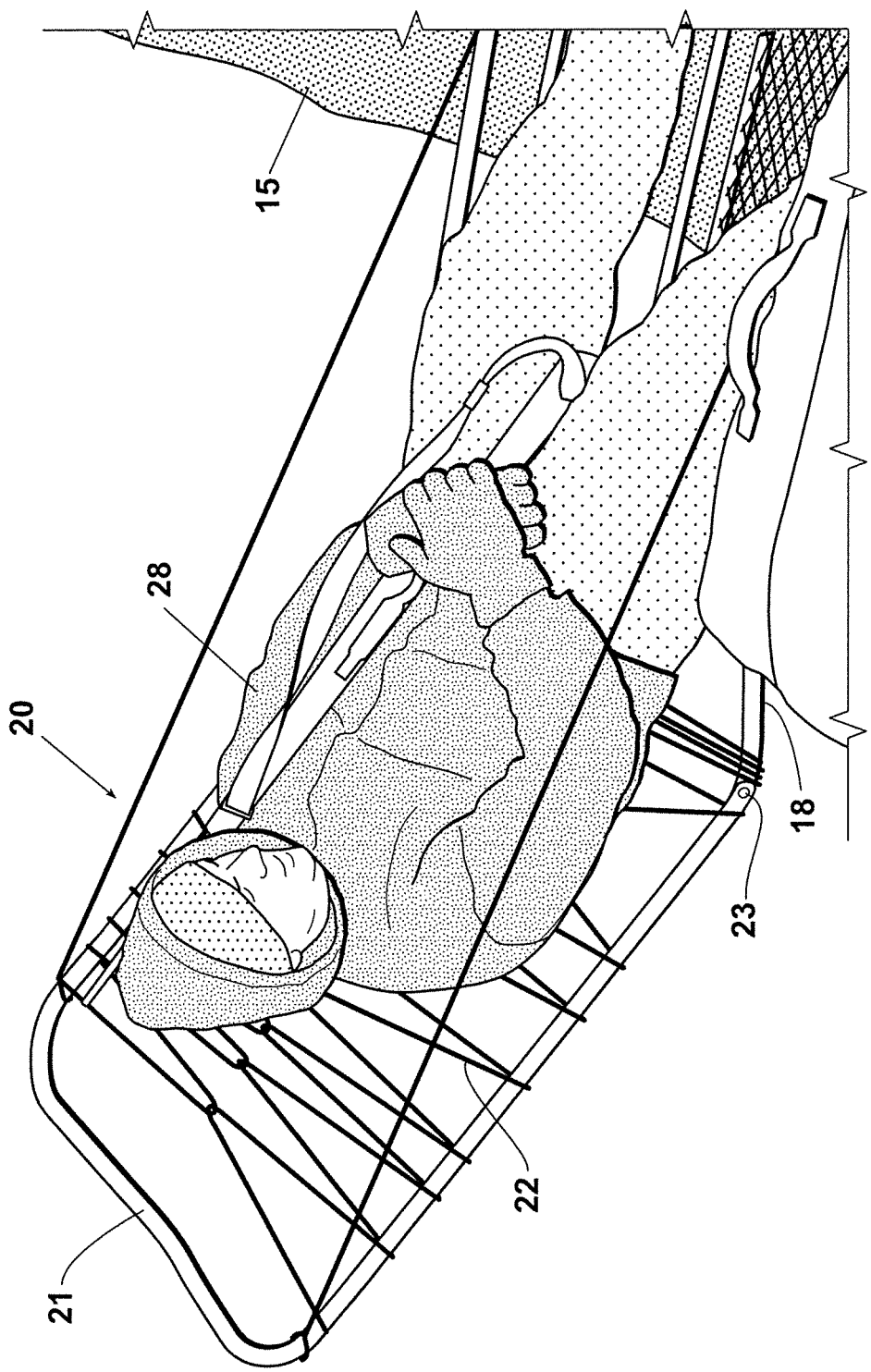
FIG. 2 depicts the tree stand of the present invention secured to a tree and particularly a seat portion, including a hunter positioned therein.
Figure 3:
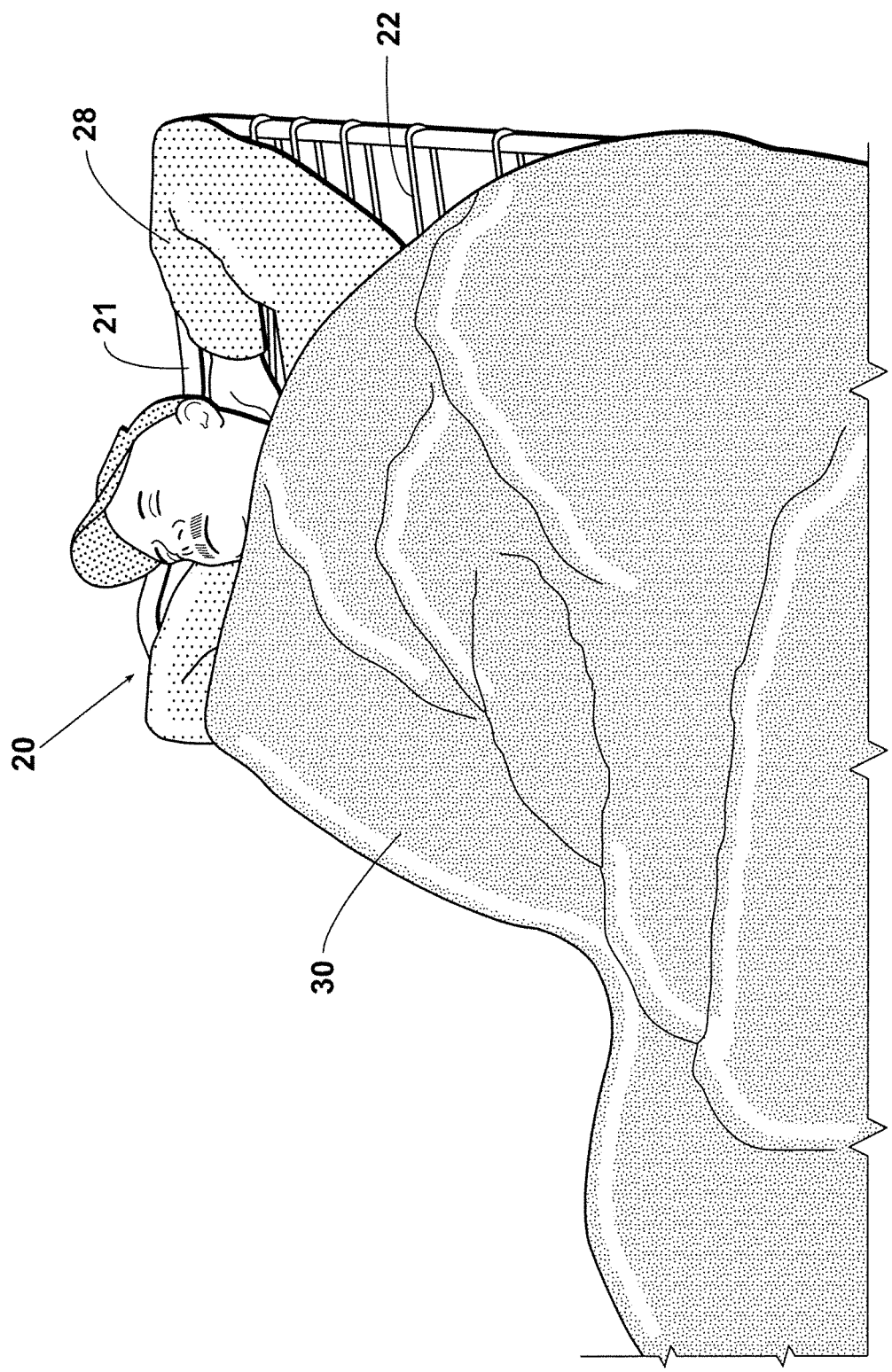
FIG. 3 is a view of the tree stand of the present disclosure mounted to a tree and including the seat portion with a hunter contained therein covered by a weatherproof blanket.

With reference to FIG. 1 taken in conjunction with FIGS. 2 and 3, on one end and within the basket box frame 10 in a preferred embodiment, there is a seat structure 20 forming a place for an occupant 28 to sit. Seat structure 20 preferably includes a seat bottom 18 and seat back 22 as depicted in FIGS. 1-3. Seat back 22 is comprised of a frame that hinges at the bottom in order to allow the occupant to manipulate the seat back to a position that suits the occupant, most likely for comfort/readiness or both. By way of example, seat back 22 could be positioned as shown in FIG. 1 to provide support for a rifle, spotting scope, camera and the like while the occupant 28 is standing on platform 16 and then repositioned for comfort as shown in FIGS. 2 and 3. The frame that defines the seat bottom 18 and seat back 22 may be constructed of any suitable material, such as metal, wood, carbon fiber, or plastic.

Both the seat bottom frame and seat back frame may be covered with canvas, mesh, a plastic or other known suitable type material stretched to the sides of their respective frames to create seat bottom 18 and seat back 22. In a basic embodiment, seat bottom 18 and/or seat back 22 could be formed of solid, or slatted wood, plastic or metal. Alternately, cord or strips of material (such as nylon or other suitable material) could be either laced, woven or attached (stretched) between the frame elements to form seat bottom 18 and/or seat back 22 suitable to support at least one occupant 28. The end of the metal frame that defines the back of the seat 21 and at least one horizontal member at the hinged end 23 will, in a preferred arrangement, be bent in an arch away from the occupant in a way that prevents the occupant from making contact with them. A belt or other restraint could be included on the seat structure 20 at seat bottom 18 and/or seat back 22 which may assist in containing the occupant in the seat.

In another embodiment, light gauge sheet metal, plastic, wood, carbon fiber, canvas or other suitable material can be stretched across/between arched members 21 and 23 to make seat back 22 weatherproof. When the basket frame 14 and seat back 22 are covered with light gauge sheet metal, canvas, or other suitable durable weather resistant material, the seat back 22 can be folded forward when not in use to act as a lid making the inside of basket frame 14 and stand 10 weather proof and varmint proof. The formed enclosed structure may also include additional insulation or structure to form a further weather tight seal.

In yet another embodiment, tree stand 10 of the present disclosure may include a chemical toilet type device. In such an embodiment, the chemical toilet type device could be placed or secured under seat bottom 18 such that seat bottom 18 could hinge allowing it to rotate out of the way in order to expose the chemical toilet type device.

A weatherproof blanket, canvas, or other suitable material, preferably made of fire resistant material (such as flamex or nomex), can be secured to the top of the box/basket frame 14 at the end opposite seat structure 20. This blanket 30 can be spread over the open top of box frame 14 and over the person 28 occupying the stand as depicted in FIG. 3. Blanket 30 may be either draped across the occupant 28 (as depicted in FIG. 3) or stretched taut by basket frame 14. Blanket 30 may serve to provide a warm and/or dry environment for occupant 28 and may also or alternately serve to contain the scent of occupant 30 in an effort to prevent wildlife from detecting him/her.

With basket frame 14 enclosed (and possibly insulated) as described above, and with the weatherproof blanket secured over occupant 28 a semi-enclosed structure may be formed. A candle, lantern, or known flame type warming device or device for simple food or beverage warming or preparation, or even an entertainment or communication device such as a radio (small) TV, video game, computer or phone may be employed within this semi-enclosed structure. A ceramic, metal or other suitable, preferably non-flammable enclosure can be affixed to the bottom forming platform 16 at the end opposite the seat to allow a candle or flame type warming device or lighting device to be contained therein. The purpose of such an embodiment may be to provide heat and/or light for the occupant. The heat and/or light produced may be contained within the enclosure. In the case of a light or sound generating device, the light or sound may be enclosed or muffled within the structure so as not to attract the attention of wildlife.

Figure 4:
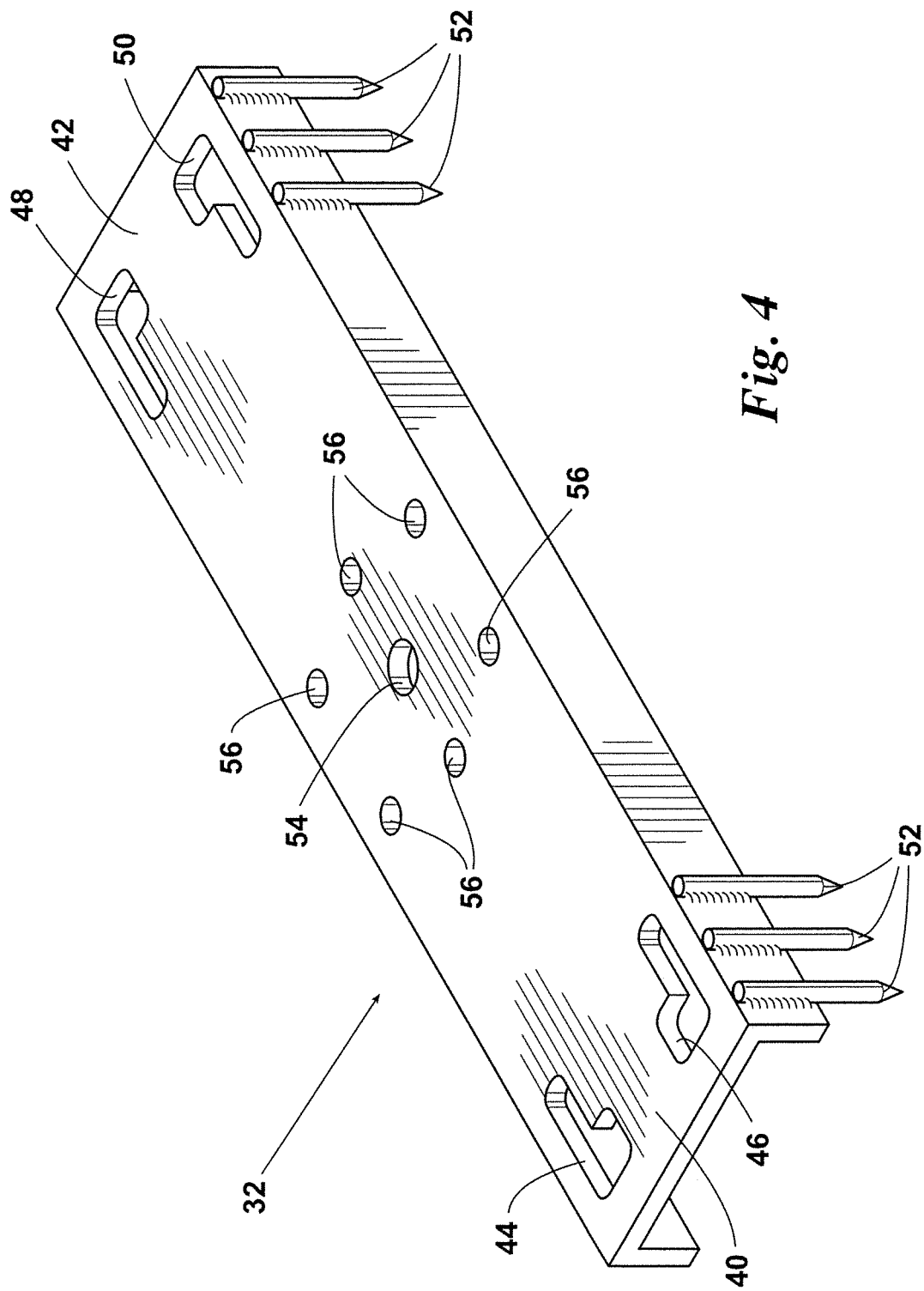
FIG. 4 is an isometric view of the base component of the bracket of the tree stand of the present disclosure.

A bracket 12 to facilitate the proper, most often level, mounting of tree stand 10 to a tree 15 or other like elevated structure can be provided. Bracket 12 includes three primary components: a base component 32 (FIG. 4), mounting member 34 (FIG. 5), and hinge assembly 36 (FIG. 6).

With reference to FIG. 1, base component 34 is designed to be anchored to tree 15 or other like elevated structure by known means such as bolts, chains and tensioning devices such as boomers, or ratchet straps. Other such anchoring structures and/or methods will be apparent to one of skill in the art. FIG. 1 depicts base component 34 secured to tree 15 by exemplary ratchet straps 38 and 39.

To accommodate bolts, base component 32 has a hole 40 and 42 drilled at each end which are respectively centered side to side. To accommodate ratchet straps such as 38 and 39 (FIG. 1), base component 32 has slots 44, 46 48 and 50 cut length ways at each of the four corners of base component 32. Base component 32 has preferably a plurality of sharp teeth (collectively 52) or the like affixed to each side at both ends of base component 32 to penetrate and/or grip the soft bark and outer wood of the tree 15 it is mounted to in order to prevent rotation of base component 32 and provide stability. Centered both end to end and side to side, base component 32 preferably includes a hole 54 drilled for the purpose of attaching hinge assembly 36 by means of a fastener, such as a bolt (or the like). Arranged evenly around hole 36 and at a set predetermined distance, a plurality, and most preferably six, additional holes (collectively 56) are drilled and threaded to receive fasteners such as bolts that are loosened or removed to allow rotation of hinge assembly 36 with respect to base component 32 and replaced and tightened to lock hinge assembly 36 in place with respect to base component 32 once suitable adjustment is achieved.

Figure 5:
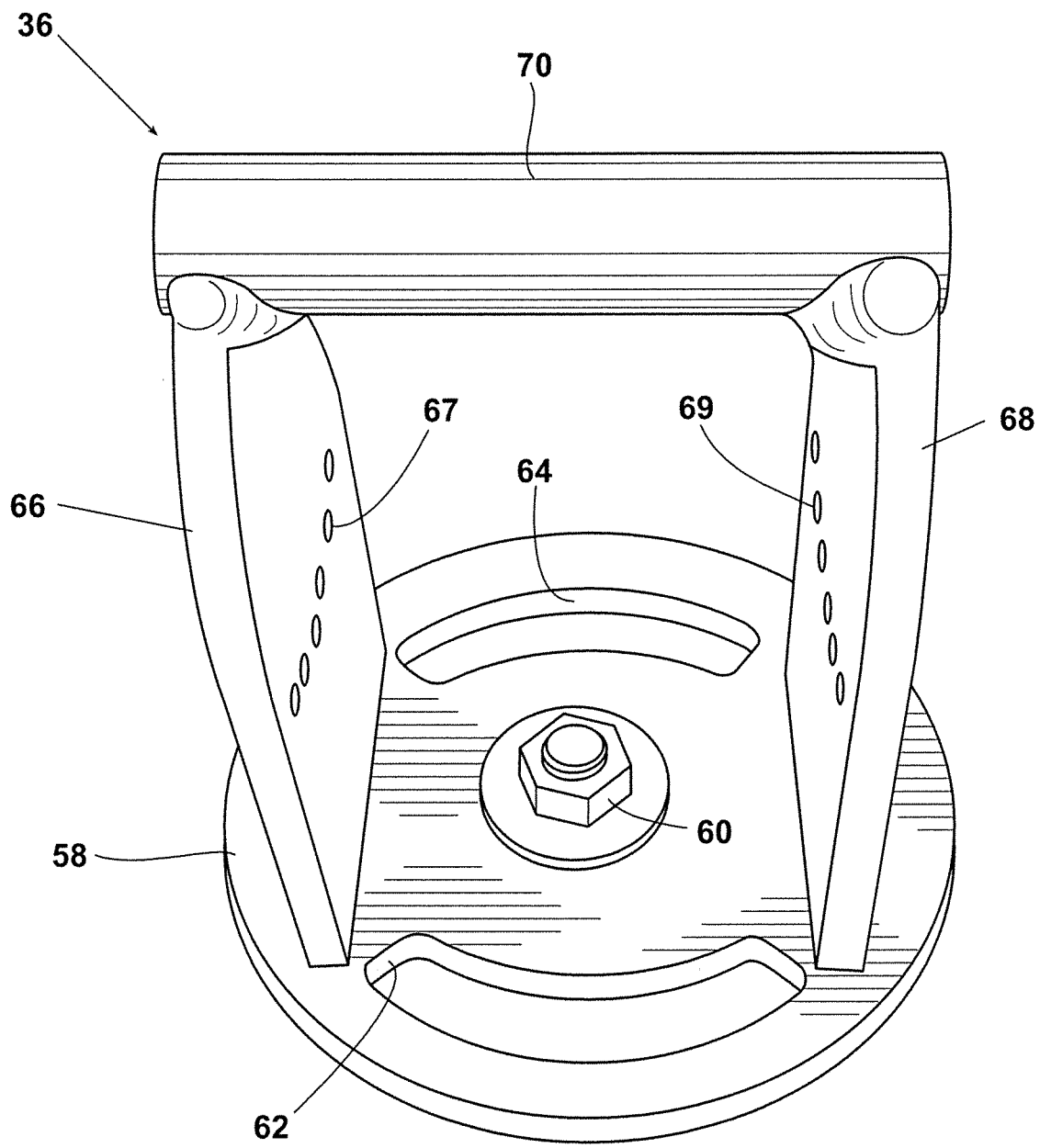
FIG. 5 depicts the hinge component of the bracket of the tree stand of the present disclosure.
Figure 6:
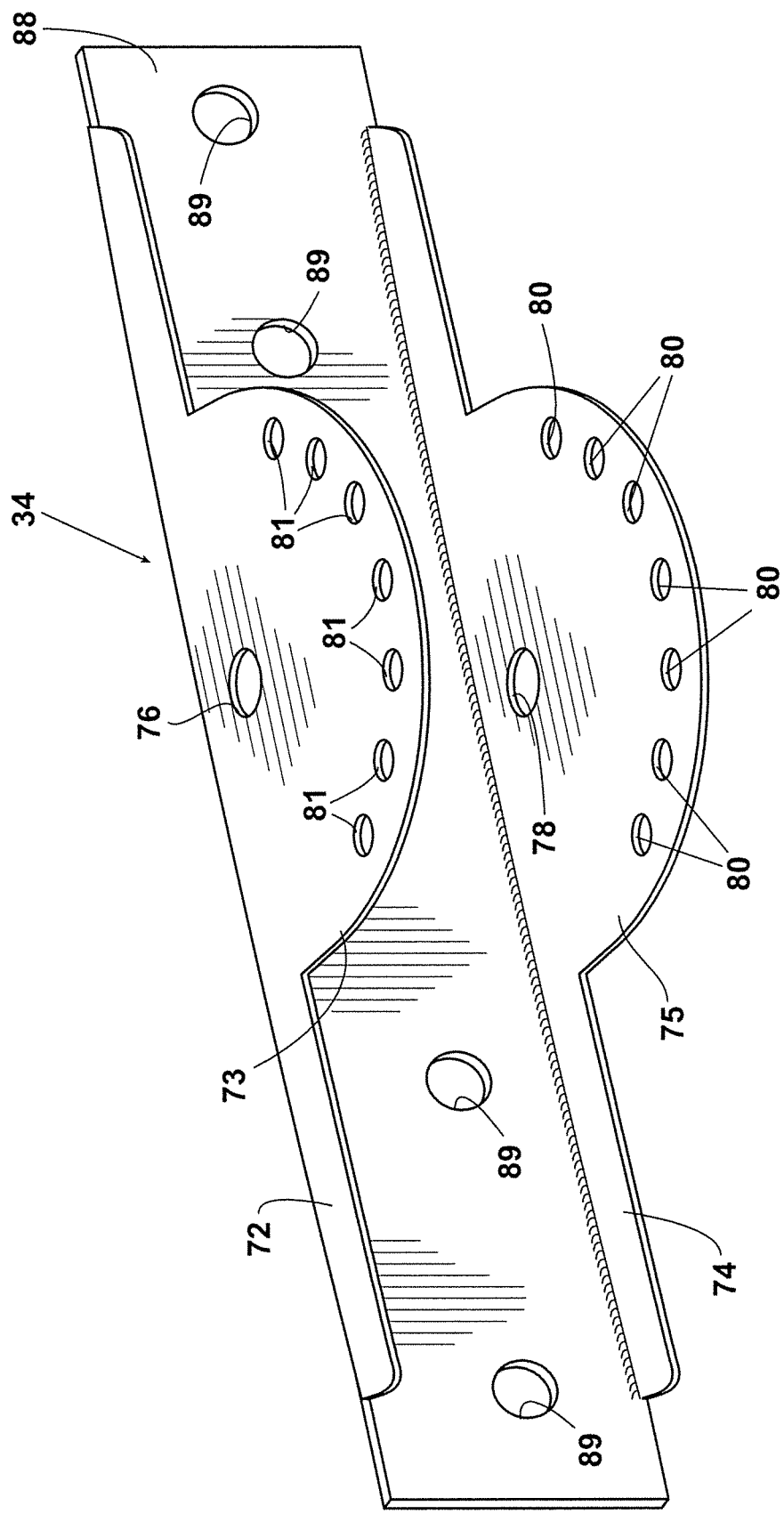
FIG. 6 is an isometric view of the mounting member of the bracket of the tree stand of the present disclosure.
Figure 7:
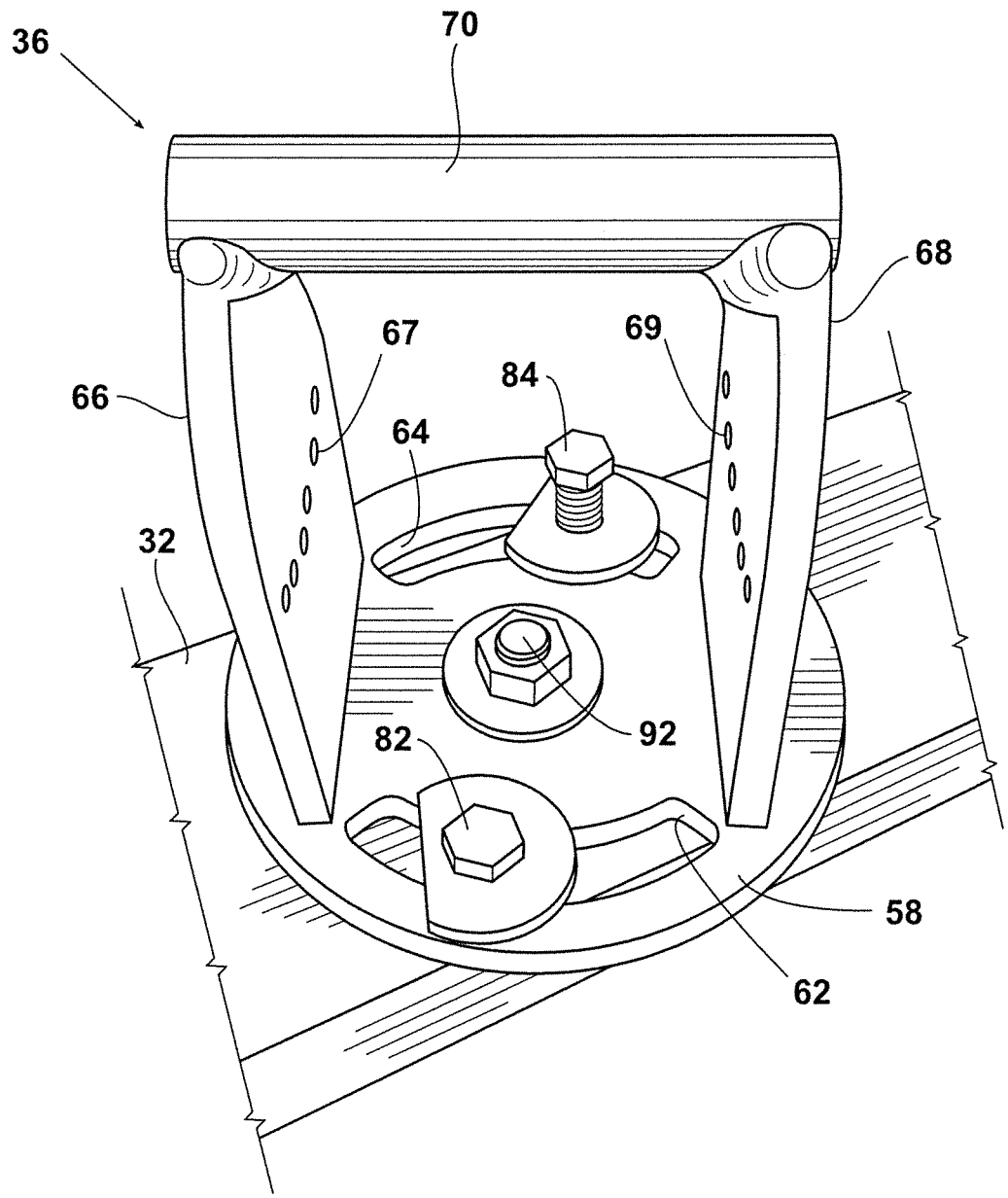
FIG. 7 depicts the hinge component of the bracket secured to the mounting member of the bracket of the tree stand of the present disclosure.

The hinge assembly 36 of mounting bracket 12 is depicted in FIG. 5 and consists of a round plate that, in a preferred arrangement, is approximately the same diameter as base component 32 is wide. Plate 58 has a hole 60 cut at its center that matches hole 54 at the center of base component 32. Two arching slots 62 and 64 are cut in plate 58 at a distance substantially equal to the distance of the six holes 56 that were drilled and tapped in base component 32. In this way hinge assembly 36 is capable of rotation (pivot) in a first axis with respect to base component 32. In a preferred arrangement, slots 62 and 64 are long enough such that once plate 58 is attached to base component 32 by means of a fastener (preferably a bolt 92 of FIG. 7) through the center holes 54 and 60 of base component 32 and plate 58 respectively, two of the drilled and tapped holes 56 in base component 32 will always be exposed, no matter how plate 58 is rotated in relation to base component 32, thereby permitting at least one fastener (bolt) such as 82 and/or 84 of FIG. 7 to be placed through slots 62 and 64 respectively and threaded into two opposite holes in base component 32. These two bolts 82 and 84 (FIG. 7), when tightened, will prevent plate 58 from rotating with respect to base component 32, however hinge assembly 36 is repositionable with respect to base component 32 by loosening and retightening bolts 82 and 84.

Welded (or secured in suitable fashion) substantially perpendicular in the preferred arrangement to the plate 58 there are preferably two pieces of metal strap 66 and 68 approximately 6" long (preferably). In a preferred arrangement, straps 66 and 68 are parallel to one another. At the other end (opposite plate 58) of metal straps 66 and 68 a piece of material, such as pipe 70 in a preferred arrangement, approximately the same length that base 32 is wide and preferably having approximately a ¾" inside diameter, is secured (preferably welded) in a way that results in pipe 70 being parallel to plate 58 as depicted in FIG. 5. Pipe 70 will bolt (preferably) to the mounting member 34 allowing the mounting member 34 to hinge pivot in a second axis in relation to base component 32.

The mounting member 34 (FIG. 6) is a piece of metal (preferably) made to attach to the basket frame 14 of tree stand 10 of the present disclosure in any one of a plurality of positions (the front, either the left or right side, the back, or the bottom). In the preferred arrangement there are five (5) such positions (the front [1], either the left [2] or right [3] side, the back [4], or the bottom [5]). Mounting member 34 includes a flat side 88 which includes a plurality of holes 89 thereon. Basket frame 14 (FIG. 1) includes two spaced apart plates 11 and 13 positioned on each of the five sides (the front, left side, right side, back, and bottom). Plates 11 and 13 each include a slot 17. Plates 13 and slots 17 are positioned so as to match up with corresponding holes 89 in mounting member 34 such that a fastener such as a bolt or spring hinged pin is inserted through holes 89 and slots 17 so as to secure basket frame 14 to mounting member 34. It is understood that holes 89 and slots 17 could be replaced or modified so as to include tabs or other suitable quick attachment systems.

The mounting member 34 is preferably a piece of metal and is approximately the same length and width as base component 32. There is preferably a flange 72 and 74 running (approximately 1" in the preferred arrangement) down both sides of mounting plate 34. Flanges 72 and 74 can be seen in FIG. 6 depicting mounting member 34. In a preferred arrangement, flanges 72 and 74 are substantially parallel. Flanges 72 and 74 have an approximate 6" (in the preferred arrangement) half circle 73, 75 at their center. These half circles 73 and 75 include a hole drilled 76 and 78 at their center in a manner that holes 76 and 78 line up concentrically. Holes will line up with pipe 70 of hinge assembly 36 allowing a fastener (such as a long bolt 96 secured by a nut 98 of FIG. 8) to be extended through them and the above described pipe 70 allowing mounting member 34 to pivot or hinge in a second axis on this fastener/bolt 96. The above described half circles 73 and 75 will preferably have a series of holes, collectively 80, drilled around their outside edge at a suitable selected radius. These holes 80 and 81 will preferably match up with holes 67 and 69 drilled and tapped in metal straps 66 and 68 respectively on hinge assembly of the bracket 12. A fastener, preferably a bolt 94 (FIG. 8) will be threaded into the holes to lock mounting member 34 into the desired position with respect to hinge assembly 36 as mounted to base component 32.

Figure 8:
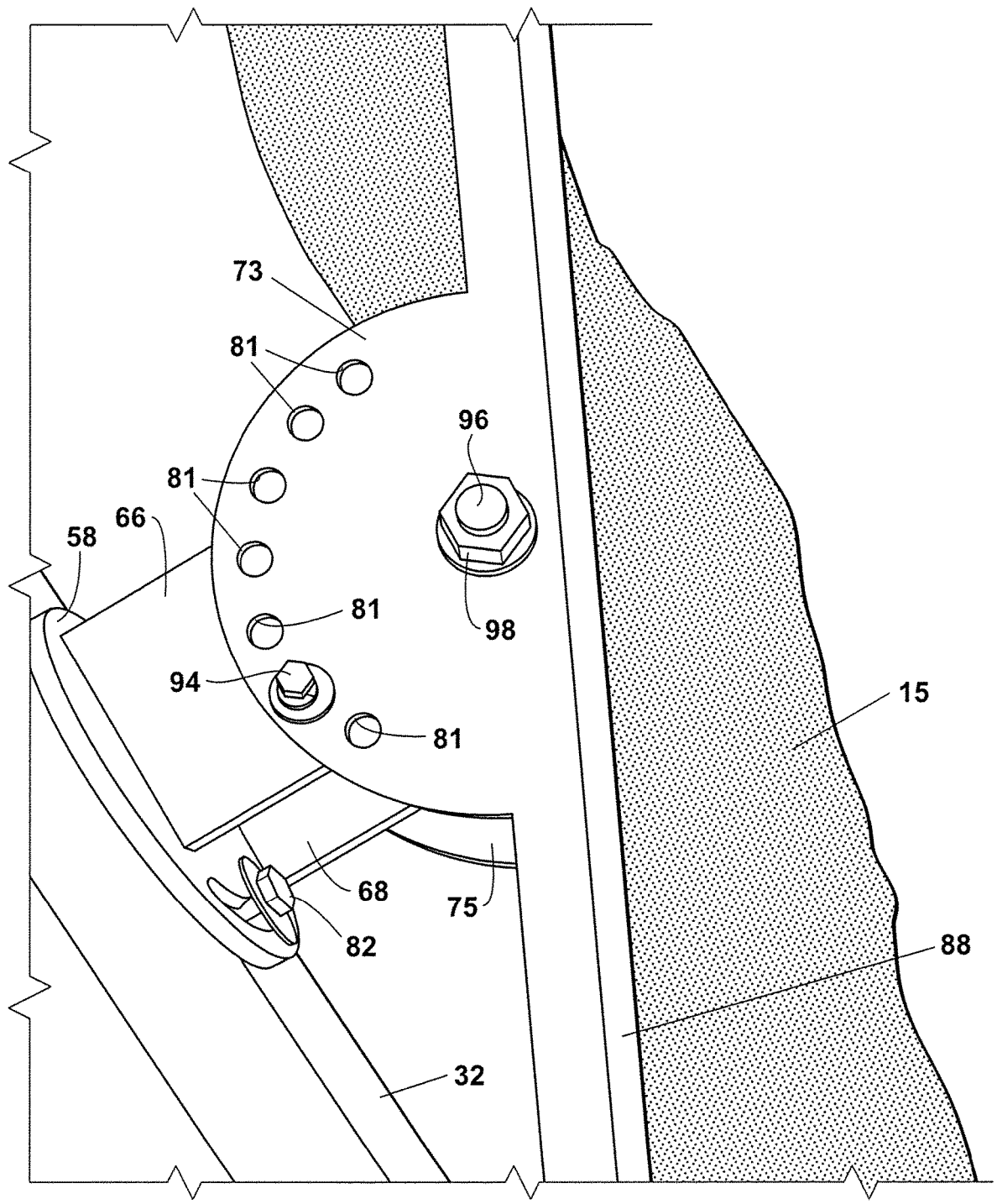
FIG. 8 depicts the bracket of the tree stand of the present disclosure mounted to a tree trunk which is growing at an angle such that the bracket is adjusted so that the mounting member is vertically oriented so as to be perpendicular to the ground.

After mounting base component 32 of the bracket 12 to any tree trunk or branch of sufficient diameter (to properly support the tree stand/occupant/gear) the two bolts 82 and 84 (FIG. 7) extending through the two arching slots 62 and 64 in the plate 58 of the hinge assembly 36 are loosened or removed, thereby allowing mounting member 34 to be rotated until it is in the desired position with respect to base component 32. Under most circumstances this will result in the long dimension of mounting member 34 being perpendicular to the ground (as shown in FIG. 1 and FIG. 8). The two bolts that go through holes 80 and 81 of sides 75 and 73 of the mounting member 34 are then removed, allowing the flat side 88 of mounting member 34 to be adjusted to a position that will allow the desired mounting of basket frame 14 of tree stand 10. The fasteners/bolts that go through holes 80 and 81 of sides 75 and 73 are then replaced and tightened. This position, once again, will, under most circumstances, be perpendicular to the ground. The fasteners/bolts 82 and 84 (FIG. 7) are then replaced through the two arching slots 62 and 64 in plate 58 of the hinge component 36, and tightened down to lock mounting member 34 in place. This process could be repeated for a different tree in a different orientation. The respective loosening, repositioning and tightening as described above produces a structure wherein the hinge assembly 36 is repositionable with respect to the base component 32 and the mounting 34 is repositionable with respect to hinge assembly 36. When positioned cooperatively, or selectively pivoted, a repositionable bracket and tree stand is provided. By using bracket 12 in this manner, tree stand 12 of the present disclosure can be properly mounted on any side of any trunk or branch, of sufficient/ suitable size and strength to support tree stand 12, occupant 28 and gear, no matter the angle of the trunk or branch.

As will be understood to one of skill in the art, many alternate embodiments for locking mounting member 34 in place in bracket 12 are contemplated. The significant concept being the ability to adjust the mounting member 34 with respect to base component 32 which may preferably use hinge assembly 36 so as to rotationally allow tree stand 10 to be properly mounted to any tree branch of adequate size and strength regardless of its positional orientation.

In an alternate embodiment, a ladder 90 (FIG. 1) could be secured to the front or either side of tree stand 10 of the preferred embodiment to make it function as a ladder stand and provide easier access to stand platform 16. An optional extra support leg that may attach to the rear of the stand would enable it to be set up on the ground next to a body of water and used as a blind to hunt water fowl. A device comprised of a frame with a water proof fabric could be attached to the top of the back of the seat to act as an umbrella to keep the hunter dry in wet weather conditions. In order to provide extra protection from the cold, a layer of insulation can be added to the inside of the light gauge sheet metal that encloses basket frame 14.

Figure 9:
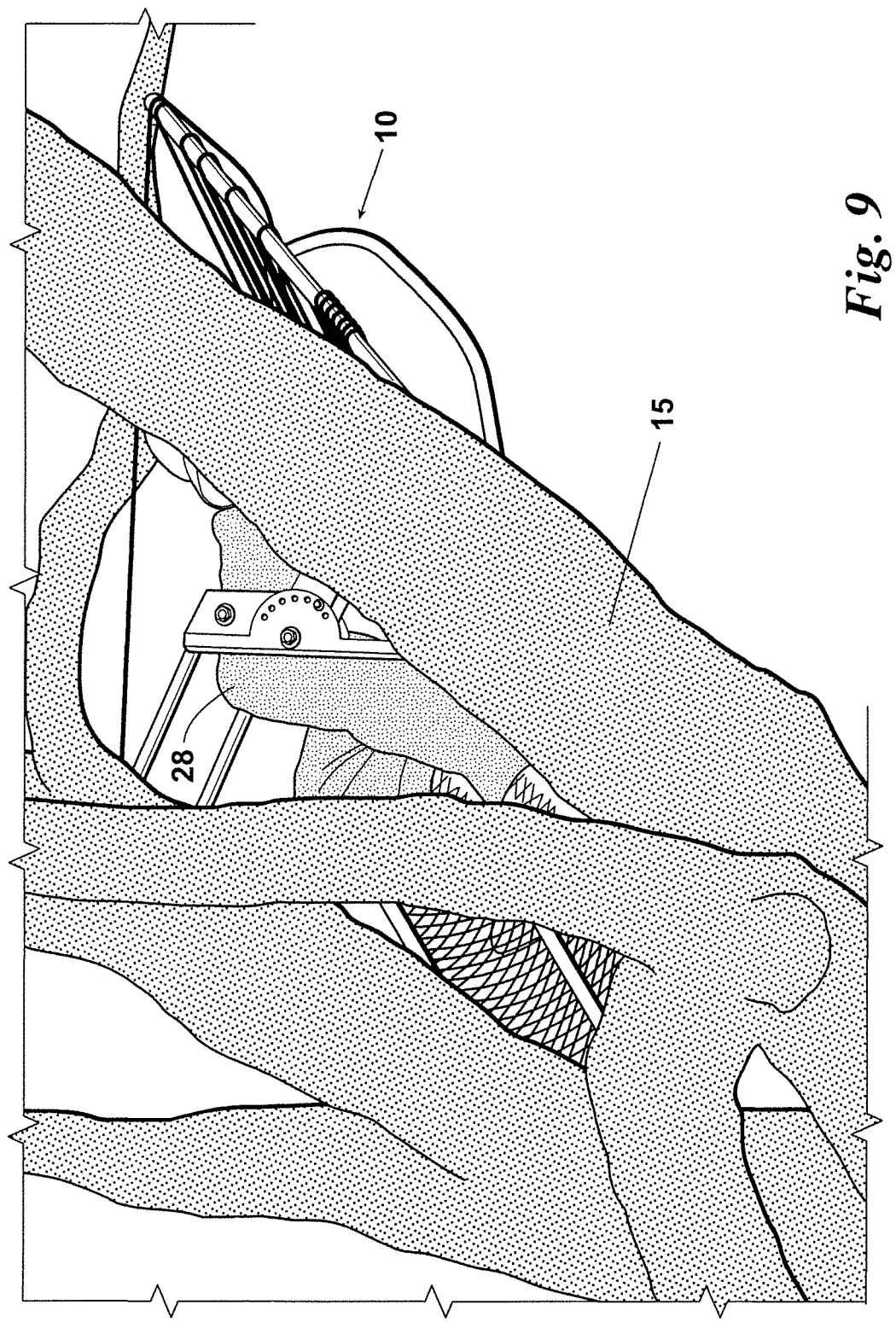
FIG. 9 is a view from the ground looking up at the tree stand of the present disclosure mounted to a tree such that the tree branch conceals the movements of the occupant of the tree stand.

By way of example, a repositionable tree stand 10 of the present disclosure is depicted in FIG. 9. As shown, tree stand 10 is secured to tree 15 in a manner that tree stand 10 and occupant 28 are, at least partially, visibly obscured from the ground view.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A repositionable tree stand for retaining an occupant above a ground, said tree stand comprising:
   a base component capable of being supported from a tree;
   a mounting member including a first flange having an arcuate portion, and a second flange having an arcuate portion;
   said first flange and said second flange being spaced apart and substantially parallel;
   a hinge assembly including a plate, a first strap and a second strap;
   said first strap and said second strap each having a first end and a second end;
   said first strap and said second strap being parallel and each extending from said plate;
   said first end of said first strap and said first end of said second strap being secured to said plate;
   a pipe secured between said second end of said first strap and said second end of said second strap;
   said first strap adapted to be repositionably securable to said first flange along its arcuate portion and said second strap adapted to be repositionably securable to said second flange along its arcuate portion such that said pipe is pivotably secured between said first flange and said second flange so that said mounting member is capable of repositionable rotation with respect to said hinge assembly;
   said plate adapted for 360° repositionable rotation with respect to said base component and securable to said base component at a desired position;
   said plate being securable to said base component by at least two-tightening fasteners;
   a frame being secured to and supported from said mounting member wherein said frame is adapted for retaining the occupant.

2. The tree stand of claim 1 wherein said hinge assembly is secured to said base component so as to be capable of repositionable rotation in a first axis with respect to said base component; and said mounting member is secured to said hinge assembly so as to be capable of repositionable rotation on a second axis with respect to said hinge assembly.

3. The tree stand of claim 1 wherein said frame further includes a seat structure.

4. The tree stand of claim 1 wherein panel members are supported from said frame so as to form an enclosed structure.

5. The tree stand of claim 1 wherein:
   said first flange and said second flange each including a first hole and a second hole therein;
   said first hole in said first flange being concentric with said first hole in said second flange;
   said second hole in said first flange being concentric with said second hole in said second flange;
   a pin inserted through either said first hole in said first flange, said pipe, and said first hole in said second flange or said second hole in said first flange, said pipe, and said second hole in said second flange so as to pivotably secure said pipe between said first flange and said second flange.

6. The tree stand of claim 1, comprising:
   said frame being a basket frame having a bottom, sides, and an open top;
   a seat structure supported from said frame adjacent said open top of said basket frame;
   said seat structure including a seat bottom and a seat back;
   said seat back being hinged and adapted for manipulation by the occupant.

7. The tree stand of claim 6 wherein said seat back is capable of selectively pivoting with respect to said seat bottom.

8. The tree stand of claim 6 wherein panel members are supported from said bottom, said sides, and said seat back; said seat back being adapted to be folded over said open top to form an enclosed structure.

9. A repositionable tree stand for retaining an occupant above a ground, said tree stand comprising:
   a base component capable of being supported from a tree;
   a mounting member including at least one flange having an arcuate portion;
   a hinge assembly including a plate and at least one strap extending from said plate;
   said plate adapted for 360° repositionable rotation with respect to said base component;
   said plate being securable to said base component at a desired position;
   said plate being securable to said base component by at least two-tightening fasteners;
   said strap adapted to be repositionably secured to said mounting member along said arcuate portion such that said mounting member is capable of repositionable rotation with respect to said hinge assembly;
   a basket frame being secured to and supported from said mounting member wherein said basket frame is capable of retaining the occupant;
   said basket frame having a bottom, sides, and an open top;
   a seat structure supported from said basket frame adjacent said open top of said basket frame;
   said seat structure including a seat bottom and a seat back;
   said seat back being hinged and adapted for manipulation by the occupant;
   said basket frame including panel members supported from said bottom, said sides, and said seat back;
   said seat back being adapted to be folded over said open top to form an enclosed structure.

10. The tree stand of claim 9 wherein said seat back is capable of selectively pivoting with respect to said seat bottom.

* * * * *